US009118891B2

(12) United States Patent
Huang et al.

(10) Patent No.: US 9,118,891 B2
(45) Date of Patent: *Aug. 25, 2015

(54) VIDEO ENCODING SYSTEM AND METHOD

(71) Applicant: MEDIATEK INC., Hsin-Chu (TW)

(72) Inventors: Yu-Wen Huang, Taipei (TW); Chih-Hui Kuo, Hsinchu (TW); Kun-Bin Lee, Taipei (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/258,047

(22) Filed: Apr. 22, 2014

(65) Prior Publication Data

US 2014/0211847 A1 Jul. 31, 2014

Related U.S. Application Data

(63) Continuation of application No. 11/695,613, filed on Apr. 3, 2007, now Pat. No. 8,737,469.

(51) Int. Cl.
*H04N 19/88* (2014.01)
*H04N 19/127* (2014.01)
*H04N 19/48* (2014.01)
*H04N 19/423* (2014.01)

(52) U.S. Cl.
CPC ....... *H04N 19/00103* (2013.01); *H04N 19/423* (2014.11); *H04N 19/48* (2014.11); *H04N 19/88* (2014.11)

(58) Field of Classification Search
CPC ...................................................... H04N 19/88
See application file for complete search history.

(56) References Cited

U.S. PATENT DOCUMENTS

| 8,126,046 B2 * | 2/2012 | Chiu et al. ............... 375/240.01 |
| 8,737,469 B1 * | 5/2014 | Huang et al. ............. 375/240.12 |
| 2005/0036696 A1 * | 2/2005 | Hatti et al. ..................... 382/233 |
| 2014/0195776 A1 * | 7/2014 | Stewart et al. ..................... 712/7 |

OTHER PUBLICATIONS

Ren et al., "A 16-pixel Parallel Architecture with Block-level/Mode-level Co-reordering Approach for Intra Prediction in 4kx2k H.264/AVC Video Encoder", 2012, pp. 801-806.*

* cited by examiner

*Primary Examiner* — Taghi Arani
*Assistant Examiner* — Thaddeus Plecha
(74) *Attorney, Agent, or Firm* — Winston Hsu; Scott Margo

(57) ABSTRACT

A video processing method for a video image consisting of a plurality of units includes: generating a plurality of information types of at least a first unit and a second unit neighboring the first unit; and storing the plurality of information types of the first unit in a first continuous address space in a buffer and storing the plurality of information types of the second unit in a second continuous address space in the buffer, wherein the first continuous address space is adjacent to the second continuous address space. The plurality of information types of the first and second units are required for coding a specific unit, and the order of the stored plurality of information types of the first and second units is manipulated in each of the first and second continuous address spaces.

14 Claims, 5 Drawing Sheets

VIDEO ENCODING SYSTEM AND METHOD

CROSS REFERENCE TO RELATED APPLICATIONS

This is a continuation application of U.S. patent application Ser. No. 11/695,613, which was filed on Apr. 3, 2007, the contents of which are included herein.

BACKGROUND

The present invention relates to video encoding systems and methods thereof.

Video Compression schemes enable video content to be sent in encoded form, minimizing the amount of data that needs to be transmitted. New compression specifications are constantly being developed as the demand for higher coding efficiency increases.

Multimedia/Video data are usually transmitted as a series of frames, wherein each frame comprises a top field and a bottom field, which may be in interlaced or progressive form. Each frame is divided into a plurality of basic encoding units known as macroblocks that respectively cover a specific rectangular picture area of a frame. A row or several rows of macroblocks are typically called a slice, wherein a slice is a larger area of the frame that can be coded independently.

The H.264/AVC (Advanced Video Coding) standard is one of the newest video compression standards on the market. This standard uses intra prediction when encoding a current macroblock. Intra prediction means utilizing other macroblock information of the same frame to encode a current macroblock. In the H.264/AVC standard, intra prediction always occurs in the spatial domain, i.e. macroblocks above and to the left of a current macroblock are utilized to encode the current macroblock. Encoding takes place in a raster scan order from the top-left macroblock to the bottom-right macroblock.

Please refer to FIG. 1. FIG. 1 is a diagram illustrating a portion of a video frame 100 comprising a plurality of macroblocks. In FIG. 1 the macroblock units are 16×16 pixels for non-MBAFF (macroblock-based adaptive frame/field) coding and are 16×32 pixels for MBAFF coding, but these are merely examples. If macroblock unit MBU5 is a current macroblock unit to be encoded, then information from MBU0, MBU1, MBU2, and MBU4 must be used. If macroblock unit MBU6 is the current macroblock unit to be encoded, then information from MBU1, MBU2, MBU3, and MBU5 must be used. In other words, a current macroblock unit requires information from a top left macroblock unit, a top macroblock unit, a top right macroblock unit, and an adjacent macroblock unit.

Each macroblock unit has a plurality of information types associated with it that can be utilized for encoding subsequent macroblock units, such as luminance information, chrominance information, motion vectors, motion vector differences etc. Encoders utilize a buffer for storing these information types. Please refer to FIG. 2 and FIG. 1 together. FIG. 2 is a diagram of a buffer 200 of a first related art encoding system. This buffer may be a DRAM, but this is merely one example. A first space 210 in the buffer 200 stores all first information types of the plurality of macroblock units, a second space 220 stores all second information types of the macroblock units, a third space 230 stores all third information types of the macroblock units, and so on. This separating of the information types in the buffer 200 can create long delays during buffer access operations. If MBU5 is the current macroblock unit to be encoded, then MBU0, MBU1, and MBU2 associated information types all need to be accessed. In simpler video compression schemes, only a few information types are associated with each macroblock unit, however, in a standard such as H.264/AVC there are twenty-two information types associated with each macroblock unit. An encoding procedure of MBU5 could therefore require up to twenty-two discontinuous accesses of the buffer 200 for a corresponding macroblock unit being referenced.

In order to minimize the number of buffer access operations another related art encoding method utilizes parallel buffers. Please refer to FIG. 3. FIG. 3 is a diagram of parallel buffers of a second related art encoding system. First information types are stored in a first buffer 310, second information types are stored in a second buffer 320, third information types are stored in a third buffer 330, etc. Although parallel access of information types can be achieved, this scheme will require twenty-two parallel buffers, thereby adding to the overall cost and complexity of the encoding system.

SUMMARY OF THE INVENTION

It is therefore an objective to provide a method and apparatus for performing video processing that overcomes the problems of the related art.

A video processing method for a video image consisting of a plurality of units comprises: generating a plurality of information types of at least a first unit and a second unit neighbouring the first unit; and storing the plurality of information types of the first unit in a first continuous address space in a buffer and storing the plurality of information types of the second unit in a second continuous address space in the buffer, wherein the first continuous address space is adjacent to the second continuous address space. The plurality of information types of the first and second units are required for coding a specific unit, and the order of the stored plurality of information types of the first and second units is manipulated in each of the first and second continuous address spaces.

A video processing system for decoding a video image consisting of a plurality of units is also disclosed. The system comprises: a decoder, for generating a plurality of information types of a first unit and a second unit neighbouring the first unit; and a buffer, coupled to the decoder, for storing the plurality of information types of the first unit in a first continuous address space of the buffer and storing the plurality of information types of the second unit in a second continuous address space of the buffer, wherein the first continuous address space is adjacent to the second continuous address space. The plurality of information types of the first and second units are required for decoding a specific unit, and the order of the stored plurality of information types of the first and second units is manipulated in each of the first and second continuous address spaces.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

As mentioned in the above, the latest compression schemes involve utilizing a plurality of information types of each macroblock unit to encode a current macroblock unit, wherein the H.264/AVC specification involves twenty-two types of information for each macroblock unit. In order to save on the number of discontinuous buffer access operations, and provide a more practical buffer storing system, the present invention stores multiple information types of a first macroblock unit in a first continuous space in the buffer, and multiple information types of a second macroblock unit in a second continuous space in the buffer, wherein the first continuous space is adjacent to the second continuous space, and the first continuous space and the second continuous space can be completely accessed in one continuous buffer access operation. In an embodiment, all information types of the first and second macroblock units are stored in the first and second continuous spaces respectively.

Figure 4:
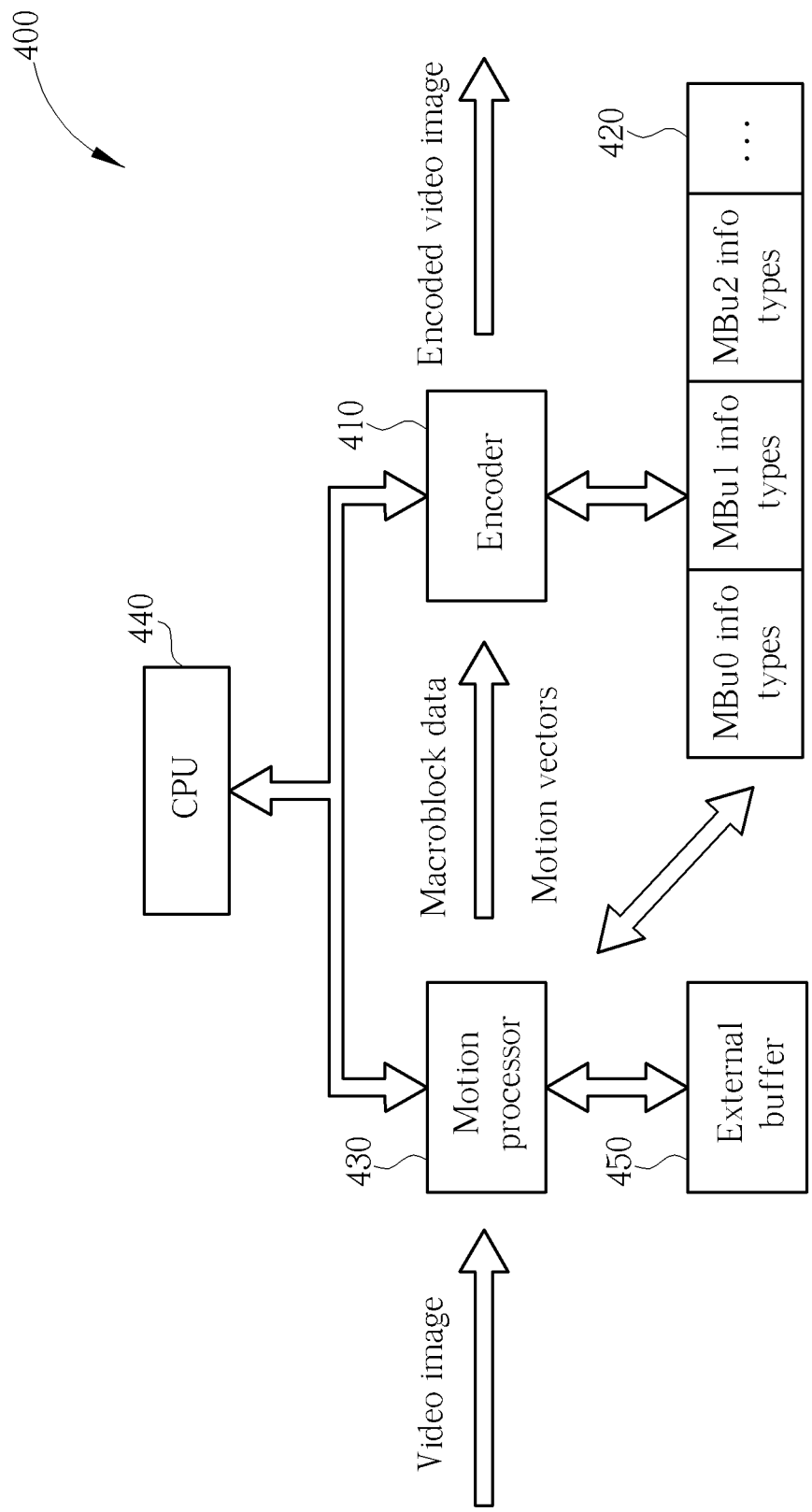
FIG. 4 is a diagram of an encoding system according to an embodiment of the present invention.

Please refer to FIG. 4. FIG. 4 is a diagram of an encoding system 400 according to an embodiment of the present invention. The encoding system 400 comprises: an encoder 410, a buffer 420, a motion processor 430, a central processing unit (CPU) 440, and an external buffer 450. Please note that the CPU 440 is not utilized for encoding operations. The motion processor 430 receives a video image, and accesses reference frames stored in the external buffer 450 to determine motion vectors and other macroblock data (information types), which will then be stored in the buffer 420. When the encoder 410 is encoding a current macroblock unit, it will access the buffer 420 to obtain information types of a top right, top, top left, and adjacent macroblock units. The motion processor 430 may also access the buffer 420 to achieve a more accurate or faster search.

The information types required for video encoding in an H.264/AVC encoding system may include motion vectors, motion vector differences, reconstructed pixels, macroblock skip flag, field decoding flag, macroblock type, transform flag, direct mode flag, luminance intra modes, chrominance intra modes, reference indices, coded block pattern, quantization parameter, DC coded block flags, AC coded block flags, etc.

Figure 1:
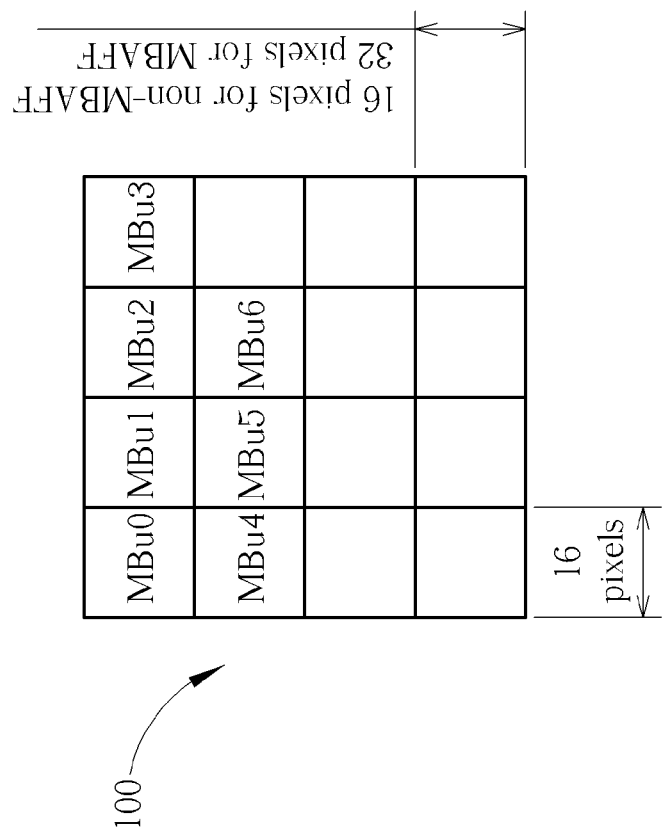
FIG. 1 is a diagram illustrating a portion of a video frame comprising a plurality of macroblock units.
Figure 2:
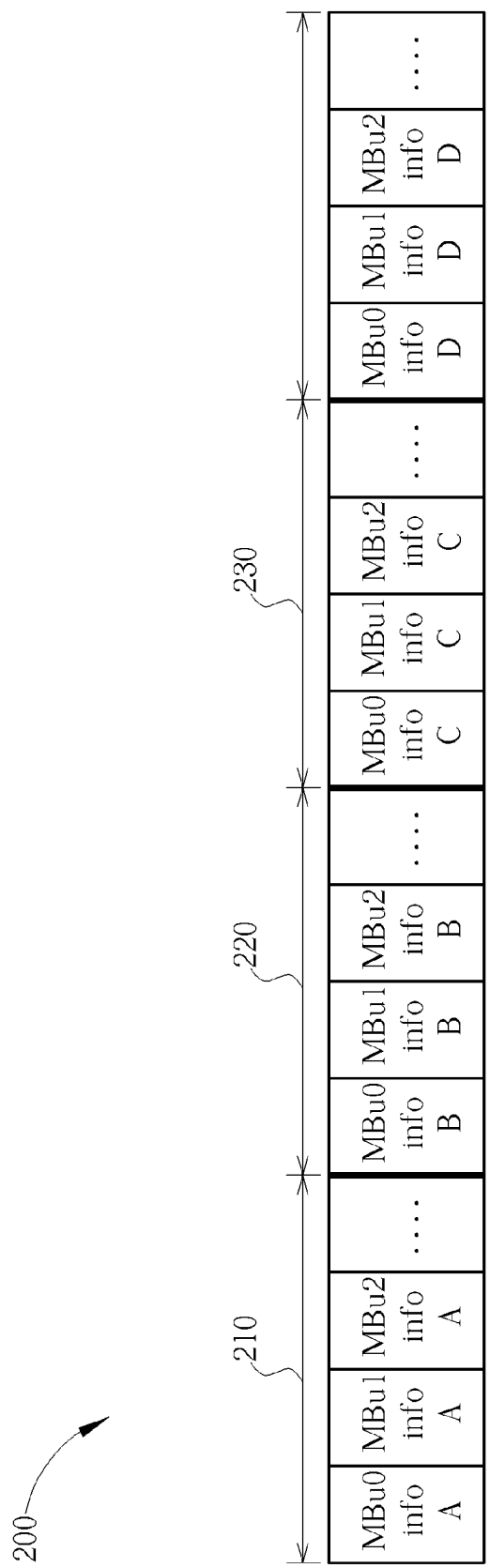
FIG. 2 is a diagram illustrating a buffer of a first related art encoding system.
Figure 3:
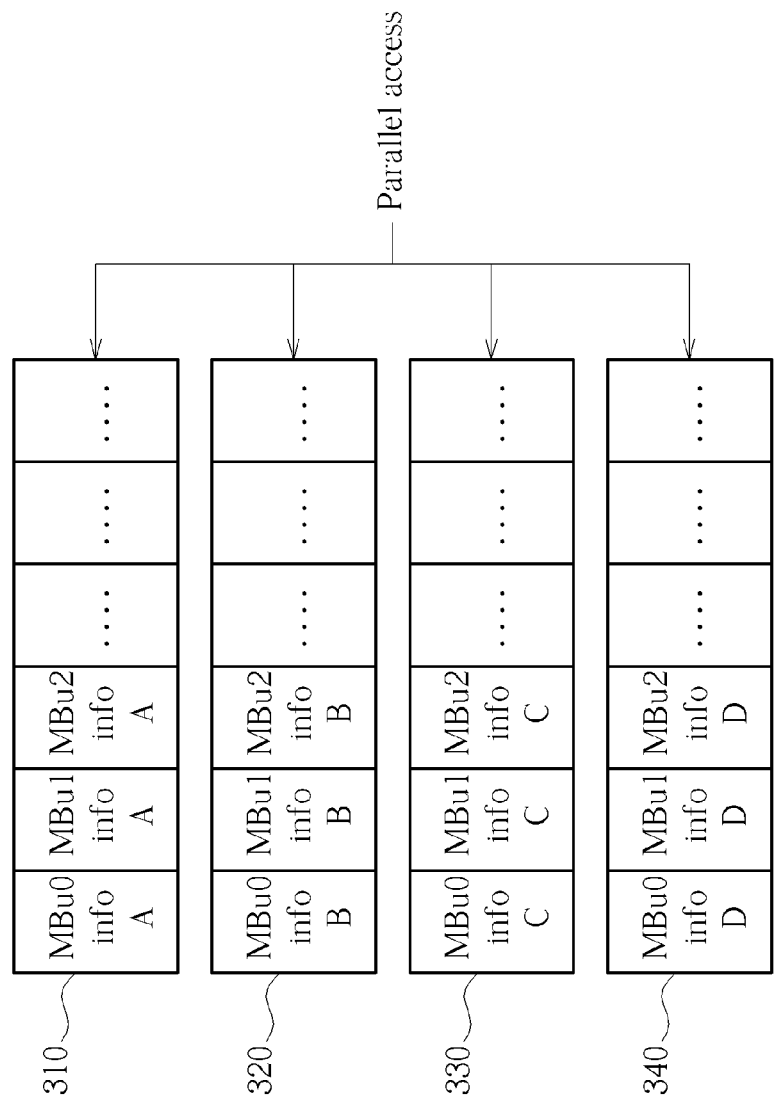
FIG. 3 is a diagram of parallel buffers of a second related art encoding system.

In order to reduce the number of discontinuous buffer accesses of the prior art in an encoding operation, all information types of a first macroblock unit are stored in a first continuous space in the buffer 420, all information types of a second macroblock unit are stored in a second continuous space in the buffer 420, all information types of a third macroblock unit are stored in a third continuous space in the buffer 420, etc. Please refer to FIG. 1 and FIG. 2 again. If MBU5 is the current macroblock unit to be encoded, then information types of MBU0, MBU1, MBU2, and MBU4 need to be accessed. In the related art shown in FIG. 2, the encoding operation would require a large number of discontinuous accesses of the buffer 200 (for example, twenty-two discontinuous accesses when twenty-two information types are needed for encoding). In the present invention, only two discontinuous buffer accesses are required, as the first continuous space, the second continuous space, and the third continuous space can all be accessed in one continuous buffer access operation. The access time is therefore considerably reduced. If information types of MBU4, which is the previous encoded MBU of MBU5, are already stored on chip after encoding, there may be no discontinuous buffer access.

Figure 5:
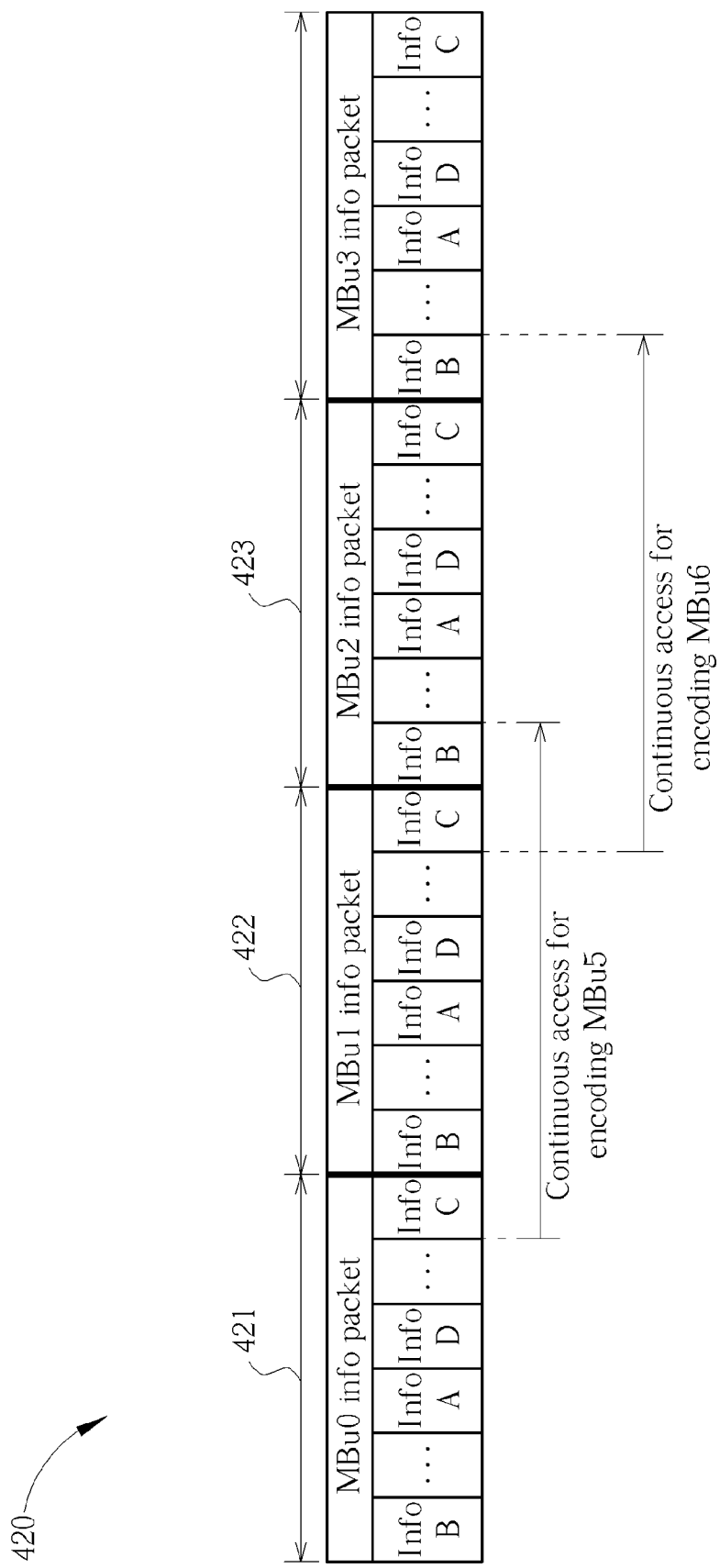
FIG. 5 is a diagram of the buffer shown in FIG. 4.

In order to minimize the total buffer access time, the present invention further discloses a method for manipulating the order of information types stored in the buffer 420. Please refer to FIG. 5. FIG. 5 is a diagram of the buffer 420 in FIG. 4. In this diagram, for simplicity, each macroblock unit only requires information type C (Type C) of its top left macroblock unit and information type B (Type B) of its top right macroblock unit and all information types of its top macroblock unit. If the first three spaces 421, 422, 423 respectively are taken as being the maximum number of consecutive spaces that are to be accessed by the encoder 410, it can be seen that by manipulating the order data is stored in the buffer 420, the amount of buffer space that needs to be accessed for an encoding operation can be minimized. As mentioned above, only specific information types need to be utilized for encoding a current macroblock unit. Therefore, the encoding system of the present invention divides information types of each macroblock into a head section (Type B), a body section (Types A, D. and other information types), and a tail section (Type C) respectively. Information needed by the right bottom macroblock unit is stored into the tail section, information needed by the bottom macroblock unit is stored into the body section, and information needed by the left bottom macroblock unit is stored into the head section.

It should be noted that the manipulation order will be the same for each macroblock unit, therefore no complicated procedures are needed to organize the different information types. This can be verified by looking at FIG. 1 and FIG. 5 again. If the current macroblock unit being encoded is now MBU5 in FIG. 1, then the encoder needs one or more information types of MBU0, MBU1, and MBU2 for encoding MBU5. As a current macroblock unit needs information type C from an upper left macroblock unit, information types A, D, and other information types from a top macroblock unit, and information type B from an upper right macroblock unit, the ordering of information types in MBU1, MBU2, and MBU3 still enables the shortest access period of the buffer 420. Please note that the particular ordering of information given here should only be considered an example, and not a limitation of the encoding system 400.

Furthermore, as the amount of data of each information type may vary, there may be a discrepancy in the number of bits stored in each space of the buffer 420. In order to make each space byte-aligned, the encoding system 400 may store stuffing bits in the buffer 420. As the manipulation order of information is the same for each macroblock unit, this also ensures that certain types of information can be easily found.

It should be noted that the disclosed method and system can also be applied to other video compression schemes, and the use of the H.264/AVC standard is merely given as an example, not a limitation of the present invention. Even if other compression schemes do not comprise as much associated information for encoding macroblocks, the disclosed invention still enables greater buffer efficiency and enables continuous buffer access during encoding operations.

By storing information of each macroblock unit in a separate space in the buffer 420, the number of discontinuous buffer access operations can be reduced. Furthermore, by manipulating the order of the information stored in the buffer 420, the encoding system 400 can further reduce the amount of buffer space that needs to be read in a single access operation. Additionally, the present invention only requires one buffer 420, resulting in less complex circuit architecture.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method for a video image consisting of a plurality of units, the method comprising:
   generating a plurality of information types of at least a first unit and a second unit neighbouring the first unit; and
   storing the plurality of information types of the first unit in a first continuous address space in a buffer and storing the plurality of information types of the second unit in a second continuous address space in the buffer, wherein the first continuous address space is adjacent to the second continuous address space;
   wherein the plurality of information types of the first and second units are required for coding a specific unit;
   wherein the order of the stored plurality of information types of the first and second units is manipulated in each of the first and second continuous address spaces.

2. The method of claim 1, wherein the step of generating a plurality of information types further comprises:
   generating a plurality of information types of each of the plurality of units;
   and the step of storing the plurality of information types further comprises:
   respectively storing the plurality of information types of each of the plurality of units in a plurality of continuous address spaces in the buffer.

3. The method of claim 2, wherein the step of storing the plurality of information types further comprises:
   storing stuffing bits in the buffer to ensure each continuous address space in the buffer is byte-aligned.

4. The method of claim 1, wherein a particular information type of the plurality of information types of the first unit is involved in processing the specific unit, the specific unit is a bottom right unit of the first unit, and the step of storing the plurality of information types further comprises storing the particular information type in a tail area of the first continuous address space.

5. The method of claim 1, wherein a particular information type of the plurality of information types of the first unit is involved in processing the specific unit, the specific unit is a bottom left unit of the first unit, and the step of storing the plurality of information types further comprises storing the particular information type in a head area of the first continuous address space.

6. The method of claim 1, wherein a particular information type of the plurality of information types of the first unit is involved in processing the specific unit, the specific unit is a bottom unit of the first unit, and the step of storing the plurality of information types further comprises storing the particular information type in a body area of the first continuous address space.

7. The method of claim 1, further comprising accessing at least two of the plurality of information types of the first unit continuously from the buffer for processing the specific unit.

8. A video processing system for decoding a video image consisting of a plurality of units, the system comprising:
   a decoder, for generating a plurality of information types of a first unit and a second unit neighbouring the first unit; and
   a buffer, coupled to the decoder, for storing the plurality of information types of the first unit in a first continuous address space of the buffer and storing the plurality of information types of the second unit in a second continuous address space of the buffer, wherein the first continuous address space is adjacent to the second continuous address space;
   wherein the plurality of information types of the first and second units are required for decoding a specific unit;
   wherein the order of the stored plurality of information types of the first and second units is manipulated in each of the first and second continuous address spaces.

9. The system of claim 8, wherein the decoder generates a plurality of information types of each of the plurality of units, and respectively stores the plurality of information types of each of the plurality of units in a plurality of continuous address spaces in the buffer.

10. The system of claim 9, wherein the decoder further stores a plurality of stuffing bits in the buffer to ensure each continuous address space in the buffer is byte-aligned.

11. The system of claim 8, wherein a particular information type of the plurality of information types of the first unit is involved in processing the specific unit, the specific unit is a bottom right unit of the first unit, and the decoder stores the particular information type in a tail area of the first continuous address space.

12. The system of claim 8, wherein a particular information type of the plurality of information types of the first unit is involved in processing the specific unit, the specific unit is a bottom left unit of the first unit, and the decoder stores the particular information type in a head area of the first continuous address space.

13. The system of claim 8, wherein a particular information type of the plurality of information types of the first unit is involved in processing the specific unit, the specific unit is a bottom unit of the first unit, and the decoder stores the particular information type in a body area of the first continuous address space.

14. The system of claim 8, wherein the decoder accesses at least two of the plurality of information types of the first unit continuously from the buffer for processing the specific unit.

* * * * *